Figure 1:
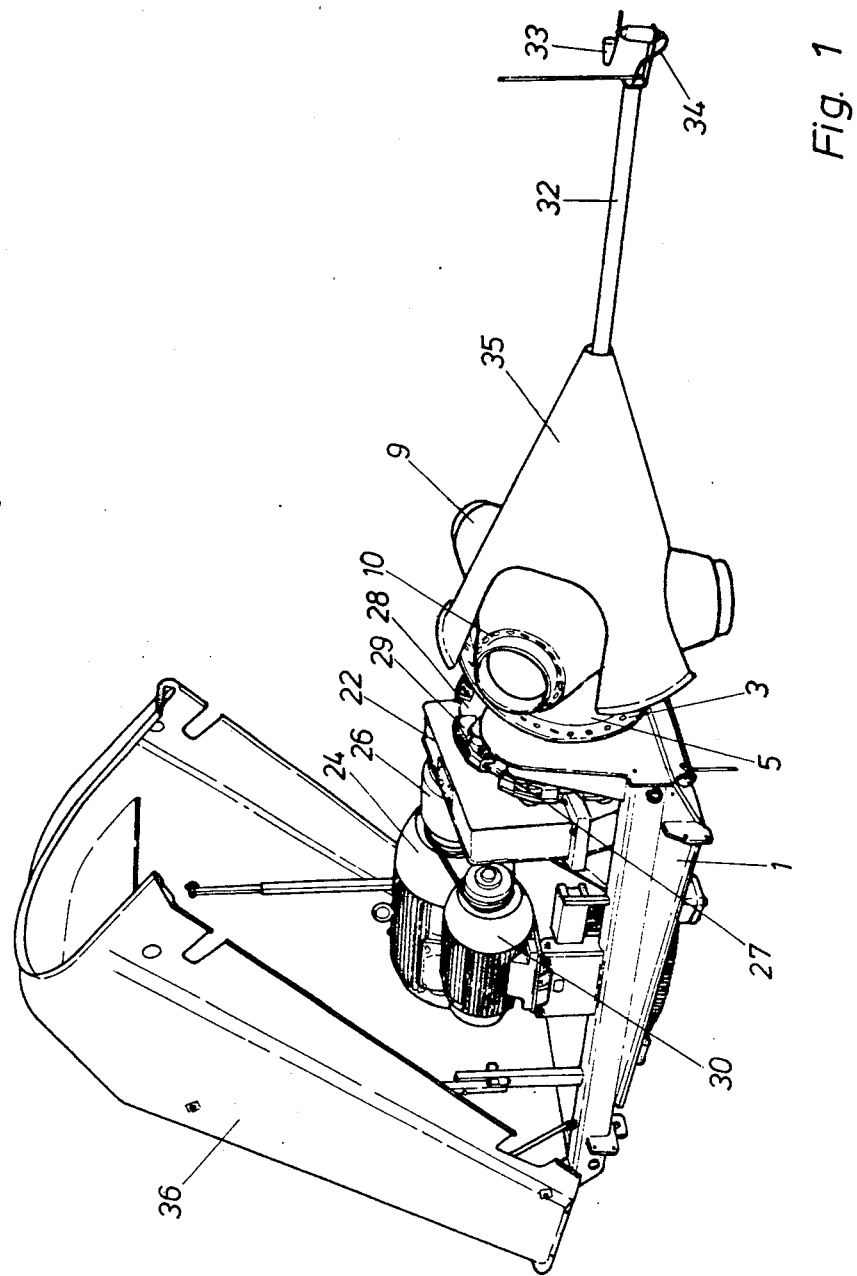

United States Patent [19]

Kristensen

[11] Patent Number: 4,757,211

[45] Date of Patent: Jul. 12, 1988

[54] MACHINE FOR GENERATING ELECTRICITY

[75] Inventor: Ejler Kristensen, Lemming, Denmark

[73] Assignee: Danregn Vidraft A/S, Denmark

[21] Appl. No.: 72,348

[22] Filed: Jul. 10, 1987

[51] Int. Cl.⁴ .............................................. F03D 1/06
[52] U.S. Cl. ...................................... 290/55; 290/44; 416/204 R
[58] Field of Search ............................ 290/44, 52, 55; 416/169 R, 170 R, 174, 204 R

[56] References Cited

U.S. PATENT DOCUMENTS

| | | | |
|---|---|---|---|
| 1,944,239 | 1/1934 | Honnef | 290/55 |
| 2,058,500 | 10/1936 | Plucker | 290/55 |
| 2,179,885 | 11/1939 | Fumagalli | 290/55 |
| 2,417,022 | 3/1947 | Stagg | 290/55 X |
| 4,198,572 | 4/1980 | Kant | 290/55 X |
| 4,371,346 | 2/1983 | Vidal | 290/55 X |
| 4,585,950 | 4/1986 | Lund | 290/55 X |
| 4,611,972 | 9/1986 | Andrae | 416/204 R X |
| 4,665,332 | 5/1987 | Meir | 416/169 R X |

Primary Examiner—William M. Shoop, Jr.
Assistant Examiner—W. E. Duncanson, Jr.
Attorney, Agent, or Firm—Darby & Darby

[57] ABSTRACT

In order to construct windmills with high capacity the machinery need to be constructed and dimensioned in such a manner that any type of damage to the machinery is avoided. This is best ensured by a hub construction, which according to the invention comprises a hub shaft (17) which to the front is connected to the blades (11) and which immediately behind the hub is connected to a gear box (22).

Dangerous vibrations are hereby avoided, because the shaft (17) is primarily exposed merely to torsional forces.

By further constructing the hub around a funnel-shaped body (5, 6) which to the back is suspended in a machine housing (1) and which on the outside carries main bearings (7), and where the blades (11) rest on the outer ring of the main bearings (7), the main bearings will primarily be exposed to radial loads.

Finally, the braking capacity is increased when a brake system is attached to a quickly rotating exit shaft (23) on the gear box (22) just as generators (24, 30) are connected to this shaft (23) by means of a safety coupling (25). Hereby it becomes possible to replace worn or flawed parts without having to disassemble the entire machine, whereby maintenance of the mill becomes more economical.

5 Claims, 2 Drawing Sheets

MACHINE FOR GENERATING ELECTRICITY

The invention relates to a machine for generating electricity comprising a pivotably mounted machine housing at the top of a tower or a similar vertical object being horizontally pivotable, in which housing a wind driven blade hub driven by means of blades is rotatably mounted, which blade hub via a substantially horizontal hub shaft and a gear box can drive one or more generators, and a brake system for braking the machine.

Windmill machines of this type are normally mounted in a machine housing which again is attached to the top of a tower on which the machine housing is horizontally pivotable.

The machine is normally mounted on a bottom frame and provided with a yaw motor which is controlled by impulses from a wind vane which will ensure that the mill is always kept in the correct position in relation to the wind.

The blades of the mill are attached to a blade hub which again is attached to a hub shaft extending through the machine housing to its rear part, where the hub shaft via a flange is connected to an entrance shaft of a gear.

To an exit shaft of said gear there is connected a generator or perhaps several generators, whereby a single generator is normally connected directly to the exit shaft of the gear, and by several generators the second or further generators are normally connected by means of a V-belt drive.

Moreover, there is mounted a brake disc at the rear side of the hub to which brake disc a number of brake calipers with blocks may engage frictionally for braking the mill.

This construction has particularly been developed for being used in small mills. If the construction is applied in large mills, such as mills with a capacity of several hundred kW, considerable problems have occurred in practice.

For instance the long hub shaft, with the result that power has to be transmitted over a long distance, has caused vibrations which via the connected components are distributed to the entire machine. Apart from making a noise this gives considerable risk of overloading bearings, flanges and suspensions etc.

Moreover, the bearings of the hub shaft are subjected to a considerable moment due to the long distances, and they will moveover be exposed to extra loads coming from the gear and the other engaging machine components.

These circumstances require an extra careful fitting and trueing-up of the cooperating machine elements, and a high degree of finish of flanges, bearing casing, etc. This increases the cost of production and fitting, and safety must be given high priority which calls for larger dimensioning of the components.

Finally, replacement of the individual components will require an almost total disassembly of the machine and thus often complete removal of the machine from the tower.

To this should be added that the heavy components of the machine, i.e. blade hub with blades and the generator or generators, are placed far from each other at each end of the hub shaft. These heavy components will due to their large interdistances from the vertical shaft, around which the machine is horizontally rotated, cause a very high moment of inertia.

When looking at a machine of the mentioned type, it is seen that the machine is moved from side to side in the horizontal plane by the wind vane and the yaw motor in that the wind is constantly blowing from slightly changing directions.

In order quickly to turn the machine upwind, when this blows from quickly varying directions, the high moment of inertia of the machine makes it necessary to apply a rather large yaw motor, and in the long run this high moment of inertia partly causes great wear of the components performing the yawing and partly means that the positioning of the machine up against the wind will not take place fast enough.

It is the object of the invention to overcome these drawbacks and disadvantages of the known constructions, and this is achieved by a machine of the mentioned type, said machine being characteristic in that the longitudinal axis of the machine housing is designed to be held in a position being parallel to the direction of the wind and having a first end facing upwind and being designed as a stepped attachment flange with bolt holes and standing transversely in relation to the longitudinal axis of the machine housing, said flange holding a funnel-shaped body by means of bolts, which body over a first tapered part and a second cylindrical part connected thereto having circular cross section extends away from the attachment flange against the direction of the wind, said cylindrical part at axial interdistances on its radial outside carrying radial inner rings of two main bearings, which with their radial outer rings cooperate with a cylindrical bore in said substantially spherical blade hub, whereby the blade hub at its radial outer surface has stepped assembly flanges with bolt holes for bolting together primarily three blades with axes in equal angle interdistance on a radial plane for the funnel-shaped body, said assembly flanges extending in tangential planes parallel to the longitudinal axis of the funnel-shaped body, whereby the blade hub at the side which faces upwind by means of bolts is attached to a disk-shaped flange being parallel to said attachment flange, said disk-shaped flange being fixedly secured to a first end of a hub shaft extending freely from the disk-shaped flange through the funnel-shaped body and into the machine housing, where the opposite other end of the hub shaft is secured to an entrance shaft on said gear box which apart from the entrance shaft has an exit shaft being connected to the generator or generators. Hereby it becomes possible to build together the blade hub with the gear in order that the length of the hub shaft can be limited to the distance from the front of the blade hub to the entrance shaft of the gear, whereby the bearings are protected against vibrations in that they are only exposed to torsional forces that influence the hub shaft with a considerable lower tension amplitude than is the case by the earlier known construction.

The moment of inertia of the machine according to the invention can thereby be made smaller than that of the hitherto known machines of equal size even though the components forming part of the machine are equally heavy. It is thereby achieved either that a smaller yaw motor can be applied and/or that wear of the components performing the yawing is reduced.

The bearings will moveover carry the weight of the blade hub directy and not over a long shaft causing a considerable moment.

This provides considerable operational advantages, i.e. first of all longer life, a steadier performance and lower noise level, just as the over-dimensioning can be limited considerably.

These circumstances make it possible to increase the capacity of the mill with no risk of a machine breakdown just as it provides considerably more simple assembly and replacement of the individual parts. Hence, almost all the components can be replaced individually, which in many cases means that such work can be carried out without taking down the entire machinery.

By, as described in claim 2, mounting the brake system on the exit shaft of the gear, the braking capacity becomes higher in that the brakes are applied to the comparatively slowmoving shaft.

By connecting the gear with the generators via a flexible coupling, as described in claim 3, the transmission of the vibrations is disconnected and a safety coupling is obtained between these components for protection against damage in the event of a breakdown.

Finally it is expedient, as described in claim 4, to suspend the coupling in a tubular casing whose ends are secured to the gear and the generator, respectively, which will facilitate assembly and disassembly of the generators.

Figure 2:
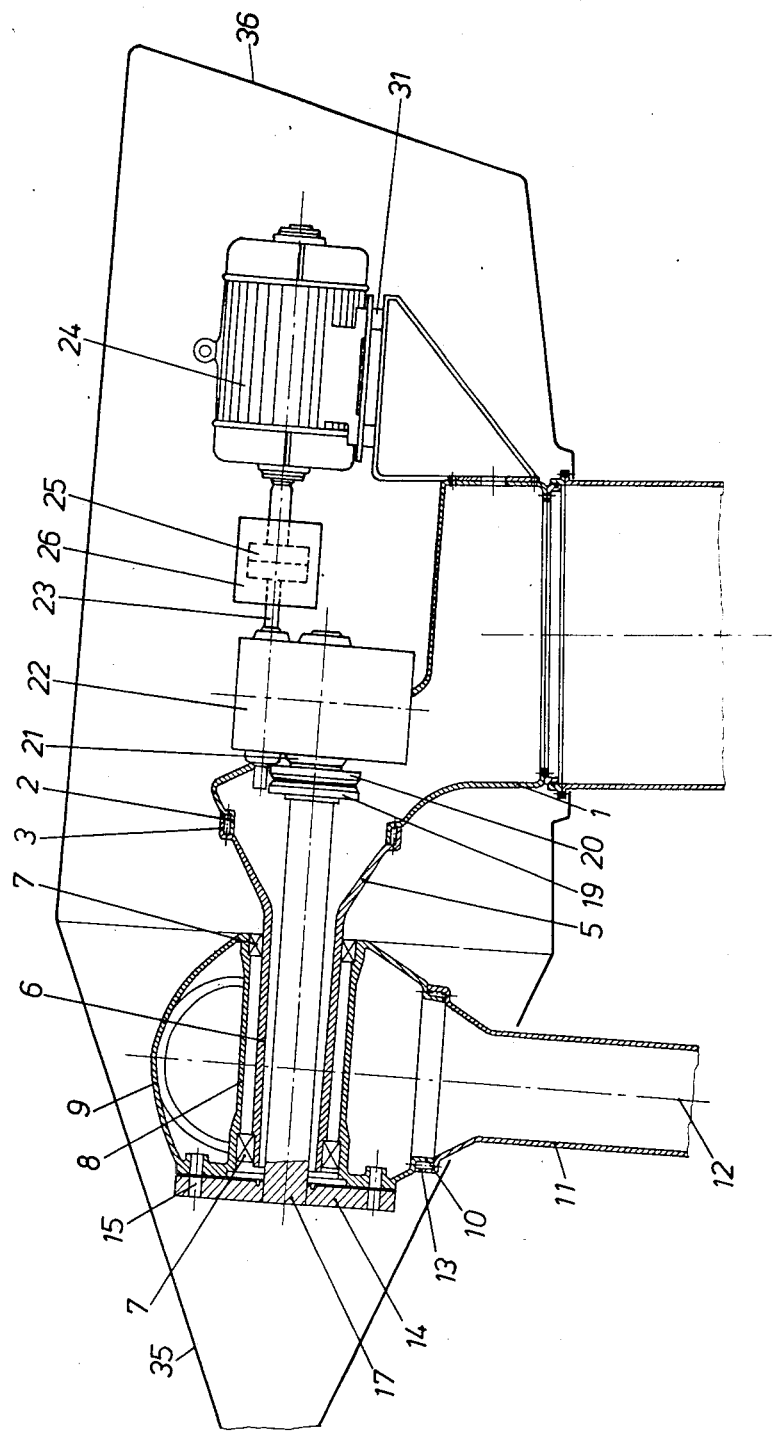

In the following the invention will be described in further detail with reference to the drawing, in which FIG. 1 shows an example of an embodiment of the machine according to the invention without blades and seen in perspective, and FIG. 2 shows a section through the essential parts of the machine arranged on a bottom frame.

FIG. 1 shows an embodiment of a machine according to the invention comprising a machine housing 1 which serves as a frame for those components that together make up the machinery which is designed to be horizontally pivotable at the top of a tower (not shown).

The machine housing 1 is substantially symmetrical around a vertical plane which contains the longitudinal axis of the machine housing 1 which usually forms an actue angle to the horizontal, in that that end which is intended to point against the wind, points upwards.

In the following this end shall be referred to as the frontmost end of all the components that form part of the machine.

The frontmost end of the machine housing 1 is designed with a stepped circular attachment flange 2, whose plane stands at right angles to the longitudinal axis of the machine housing 11. The attachment flange 2 is along its periphery provided with holes for bolts the longitudinal axis of which extend parallel to the longitudinal axis of the machine housing.

To the attachment flange 2 an inwardly stepped supporting flange 3 is attached by means of the mentioned bolts to a funnel-shaped body being rotarily symmetrical around an axis which body from the supporting flange 3 over a tapered first part 5 facing upwind continues in a substantially relatively long cylindrical part 6.

The steps of the cooperating flanges 2 and 3 contribute to centering the funnel-shaped body 5, 6 on the machine housing 1.

The radial inner ring of two main bearings 7, primarily roller bearings which may take a considerable load, is placed partly at the free end of the radial outside of the cylindrical part 6 and partly at the passage between the cylindrical part 6 and the tapered part 5.

The radial outer rings of the main housing 7 cooperate with the radial inner side of a bore 8 extending through an essentially spherical blade hub 9 said hub 9 at its radial outer surface having stepped assembly flanges 10 provided with bolt holes for bolting together primarily three blades 11, whose axes are positioned at equal angle interdistances in a radial plane 12 for the funnel-shaped body 5, 6, whereby the plane of the assembly flanges 10 extends in tangential planes parallel to the longitudinal axis of the funnel-shaped body 5, 6.

The steps of the assembly flanges 10 serve the purpose of centering the blade flanges 13 on the radially innermost end of the blades 11 in the same manner as is the case with the attachment flange 2 and the supporting flange 3.

A disk-shaped flange 14 is secured to the frontmost end of the cylindrical part 6 of the funnel-shaped body by means of bolts 15 extending parallel to the longitudinal axis of the machine housing.

In order to avoid unnecessary tensions and vibrations flexible bushes are arranged around the individual bolts 15

The disk-shaped flange 14 is fixedly secured to a hub shaft 17 which from the flange 14 extends freely rotatably through the longitudinal bore 8 in the funnel-shaped body 5, 6 and into the machine housing 1 in that the end of the hub shaft 17 that protrudes into the machine housing 1 is fixedly connected with a connection flange 19 immediately within the attachment flange 2 of the machine housing.

The connection flange 19 is by means of bolts fixedly connected with an entrance flange 20 at the entrance shaft 21 of a gear box 22 which has an exit shaft 23 being parallel to the entrance shaft 21.

In the gear box 22 the rotary speed is conversed by the relatively slowly rotating entrance shaft 21 in such a manner that the exit shaft 23 rotates at a speed that enables a direct connection to a generator 24 via a coupling 25.

The coupling 25 is a flexible coupling which may adsorb any small variation in the number of revolutions of the exit shaft 23, which coupling 25 is placed in a coupling housing 26 which at its ends is designed with flanges which may cooperate with the rearmost part of the gear box 22 and with the frontmost part of the generator 24, respectively, in order that the gear box 22, the coupling housing 26 and the generator 24 can be centered in continuation of each other and be bolted together by means of bolts not shown in the drawing in the same manner as for instance the bolts bolt together the attachment flange 2 with the supporting flange 3.

Towards the front of a free end of the exit shaft 23 there is mounted a brake system 27 which is primarily a disk brake with a brake disk 28 and caliper 29 which can be used for braking the mill at high wind speeds.

Besides the one generator 24 directly connected to the exit shaft 23 as shown in the drawing, further generators 30 may be connected by means of a V-belt drive.

The gear box 22, the coupling housing 26 and the generators 24, 30 are all dispensed by arms or feet, which via vibration dampening elements 31 are attached to the machine housing 1.

The hub shaft 17 is provided with a throughgoing bore with such a diameter that the hub shaft 17 can rotate freely around a stay 32 inserted in the bore and carrying a wind vane 33 and a cable 34 transmitting impulses from the wind vane to the yaw motor (not shown) which keeps the machine according to the invention up against the wind.

The blade hub 9 and the radially innermost ends of the blades 11 with the assembly flanges 10 and the blade flanges 13 are covered by a hood 35 being tapered towards the front which serves the purpose of passing the wind past the blade hub etc. in that the hood 35 to the rear is directly adjacent to a mill cap 36 which covers the machine housing 1 and such components as are positioned thereon. By the mentioned embodiment of the attachment flange 2, the supporting flange 3, the assembly flanges 10 and the blade flanges 13 there is provided a reliable manner of centering the cooperating parts, and by using ordinary bolts for bolting together the flanges there is a achieved a reliable and easily produced assembly.. By the use of flexible bushes around the bolts it is achieved that vibrations and tensions are not transmitted from one part to the other.

Moreover, the present embodiment of the funnel-shaped body 5, 6, the blade hub 9 and the power transmission via the disk-shaped flange 14 and the hub shaft 17 provide an extremely expedient power distribution and transmission of power from the blades 11 to the connection flange 19 of the hub shaft, because the hub shaft 17 in all essentials is only exposed to torsional forces in that the own weight of the blades 11 and the blade hub 9 and the wind pressure are absorbed as direct radial loads by the main bearings 7 and are therefore transmitted to the strong construction which is formed by the funnel-shaped body 5, 6 and the machine housing 1, which construction offers short power arms and hence low moments. This gives the bearings 7 a long life and makes the operation of the machine extremely smooth and noiseless.

The construction also facilitates an extremely short length of the entire unit consisting of blades 11 with blade hub 9 and machine housing 1 with gear 22, coupling and generator or generators, wherefore the weights of the individual parts are situated at short distances from the point of gravity of the whole pivotable unit at the top of the tower, whereby the moment of inertia becomes small in relation to that of hitherto known constructions.

This construction makes it possible to build a mill of over 300 kW since the occurring forces are absorbed in an expedient manner with no risk of subjecting the individual parts to dangerous or harmful loads.

I claim:

1. Machine for generating electricity comprising a pivotably mounted machine housing (1) at the top of a tower or a similar vertical object being horizontally pivotable, in which housing a wind driven blade hub (9) driven by means of blades (11) is rotatably mounted, which blade hub via a substantially horizontal hub shaft (17) and a gear box (22) can drive one or more generators (24, 30), and a brake system (27) for braking the machine, characterized in that the longitudinal axis of the machine housing (1) is designed to be held in a position being parallel to the direction of the wind and having a first end facing upwind and being designed as an attachment flange (2) having bolt holes and being transversely stepped in relation to the longitudinal axis of the machine housing (1), said flange (2) holding a funnel-shaped body by means of bolts, which body over a first tapered part (5) and a second cylindrical part (6) connected thereto having circular cross section extends away from the attachment flange (2) against the direction of the wind, said cylindrical part (6) at axial interdistances on its radial outside carrying radial inner rings of two main bearings (7) which with their radial outer rings cooperate with a cylindrical bore (8) in said substantially spherical blade hub (9), whereby the blade hub (9) at its radial outer surface has stepped assembly flanges (10) with bolt holes for bolting together primarily three blades (11) with axes at equal angle interdistance on a radial plane (12) for the funnel-shaped body (5, 6), said assembly flanges (10) extending in tangential planes parallel to the longitudinal axis of the funnel-shaped body (5, 6), whereby the blade hub (9) at the side which faces the wind by means of bolts is attached to a disk-shaped flange (14) being parallel to said attachment flange (2), said disk-shaped flange (14) being fixedly secured to a first end of a hub shaft (17) extending freely from the disk-shaped flange (14) through the funnel-shaped body (5, 6) and into the machine housing (1), where the opposite other end (19) of the hub shaft (17) is secured to an entrance shaft (21) on said gear box (22) which apart from the entrance shaft (21) has an exit shaft (23) being connected to the generator (24) or generators (24, 30).

2. Machine according to claim 1, characterized in that the exit shaft (23) of the gear box (22) at its side turning away from the generator (9) or generators (24, 30) is connected to said brake system (27).

3. Machine according to claim 1, characterized in that a stationary, primarily flexible coupling (25) is inserted between the gear box (22) and the generator (24) or generators (24, 30) at the exit shaft (23) of the gear box (22).

4. Machine according to claim 1, characterized in that the coupling (25) is surrounded by a coupling housing (26) whose ends are attached to the gear box (22) and the generator (24), respectively.

5. Machine according to claim 3, characterized in that the coupling (25) is surrounded by a coupling housing (26) whose ends are attached to the gear box (22) and the generator (24), respectively.

* * * * *